United States Patent [19]

Knight

[11] Patent Number: 4,938,099

[45] Date of Patent: Jul. 3, 1990

[54] DIFFERENTIAL GEAR MECHANISM

[75] Inventor: David J. Knight, Sommerset, England

[73] Assignee: Knight Mechadyne Limited, Kirtlington Oxon, England

[21] Appl. No.: 180,987

[22] PCT Filed: Aug. 7, 1987

[86] PCT No.: PCT/GB87/00560

§ 371 Date: Apr. 11, 1988

§ 102(e) Date: Apr. 11, 1988

[87] PCT Pub. No.: WO88/01355

PCT Pub. Date: Feb. 25, 1988

[30] Foreign Application Priority Data

Aug. 11, 1986 [GB] United Kingdom ............... 8619531
Nov. 21, 1986 [GB] United Kingdom ............... 8627862

[51] Int. Cl.$^5$ ............................................. F16H 1/38
[52] U.S. Cl. ................................................. 475/226
[58] Field of Search ................... 74/715, 458; 29/159.2

[56] References Cited

U.S. PATENT DOCUMENTS 4,625,585 12/1986 Dissett .................................. 74/715
4,677,876 7/1987 Dissett .................................. 74/715
4,751,853 6/1988 Dissett .................................. 74/715

FOREIGN PATENT DOCUMENTS 124563 3/1919 United Kingdom ................ 74/715

OTHER PUBLICATIONS

European Patent Application Publication No. EP O 148 641, published 7/17/85.
International Search Report for International Appln. No. PCT/GB 87/00560.

*Primary Examiner*—Leslie A. Braun
*Assistant Examiner*—Chris Campbell
*Attorney, Agent, or Firm*—Banner, Birch, McKie & Beckett

[57] ABSTRACT

A differential gear mechanism of the type having a gear carrier (1A, 1B) mounted for rotation about the output axis of the differential, a pair of spaced coaxial helical output gears (4A, 4B) mounted for rotation in the carrier about the output axis, and gear trains mounted in the gear carrier and interconnecting the two output gears, each gear train comprising two worm members (5A-D) and a worm wheel (7A,C; 7B,D) is characterized by the following equations:

$$\frac{R_W + \cot \psi}{R_W + R_G} = \sin \alpha \qquad (1)$$

$$\frac{b_{WH}}{b_{OG}} = K_1 \frac{\tan \psi}{\cos \psi} \qquad (2)$$

3 Claims, 2 Drawing Sheets

DIFFERENTIAL GEAR MECHANISM

TECHNICAL FIELD

This invention relates to differential gear mechanisms for vehicles of the kind known for example in European patent specification No. 0 148 641.

Specifically the invention is concerned with such mechanisms of which comprise a gear casing mounted for rotation about the output axis of the differential, a pair of spaced co-axial helical output gears mounted for rotation in the carrier about the axis thereof, and gear trains mounted in the gear carrier and interconnecting the two output gears, each gear train comprising two worm members and a worm wheel, the worm members each having a helically toothed formation meshing with the worm wheel at diametrically opposite positions thereof and each worm member having an extension of the helically toothed formation meshing also with a respective one of the output gears.

Preferably, the worms and worm wheels are of the same or similar material in respect of composition and hardness.

In practice, these will either be two or three gear trains since a single train would result in unbalanced loading of the output gears while designs with more than three gear trains are unlikely to be useful in view of the resulting complexity of the multiple gear assembly.

DISCLOSURE OF THE INVENTION

A differential gear mechanism according to the invention is characterised by the following equations:

$$\frac{R_W + \cot \psi}{R_W + R_G} = \sin \alpha \quad (1)$$

$$\frac{b_{WH}}{b_{OG}} = K_1 \frac{\tan \psi}{\cos \psi} \quad (2)$$

where $R_W$ is the ratio of the number of teeth (starts) of each worm to the number of teeth of the worm wheel, $R_G$ is the ratio of the number of teeth on each output gear to the number of teeth of the worm wheel, $\psi$ is the helix angle of the worms and output gears, $b_{WH}$ and $b_{OG}$ are respectively the lengths of the teeth of worm wheel and each output gear measured axially of the worm wheel and output gear respectively, and $\alpha$ and $K_1$ are given by the following table:

| NO. OF GEAR TRAINS | $\alpha$ - DEGREES | | | K1 | | |
|---|---|---|---|---|---|---|
| | NOMINAL VALUE | RANGE POSSIBLE | PREFERRED | NOMINAL VALUE | RANGE POSSIBLE | PREFERRED |
| 2 | 62 | ±6 | ±4 | 0.65 | ±0.15 | ±0.05 |
| 3 | 38 | ±3 | ±2 | 0.5 | ±0.15 | ±0.05 |

The above defined equations help to ensure that despite the mixture of helical and worm and wheel operations, the various components have comparably long lives, thus avoiding premature wearing out of one component.

Preferably, the aspect ratio AR of the gearing, i.e. the ratio of the diameter of the imaginary cylinder enveloping the worms to the axial length between the outer ends of the teeth of the output gear is given by $$AR = \frac{(R_G + 2R_W) \tan \psi}{1 + 1.2 R_G \sin \psi} = 1.25 \pm 0.25$$

BRIEF DESCRIPTION OF THE DRAWINGS

An embodiment of the invention will now be described, by way of example, with reference to the accompanying drawings, in which.

BEST MODE FOR CARRYING OUT THE INVENTION

Figure 1:
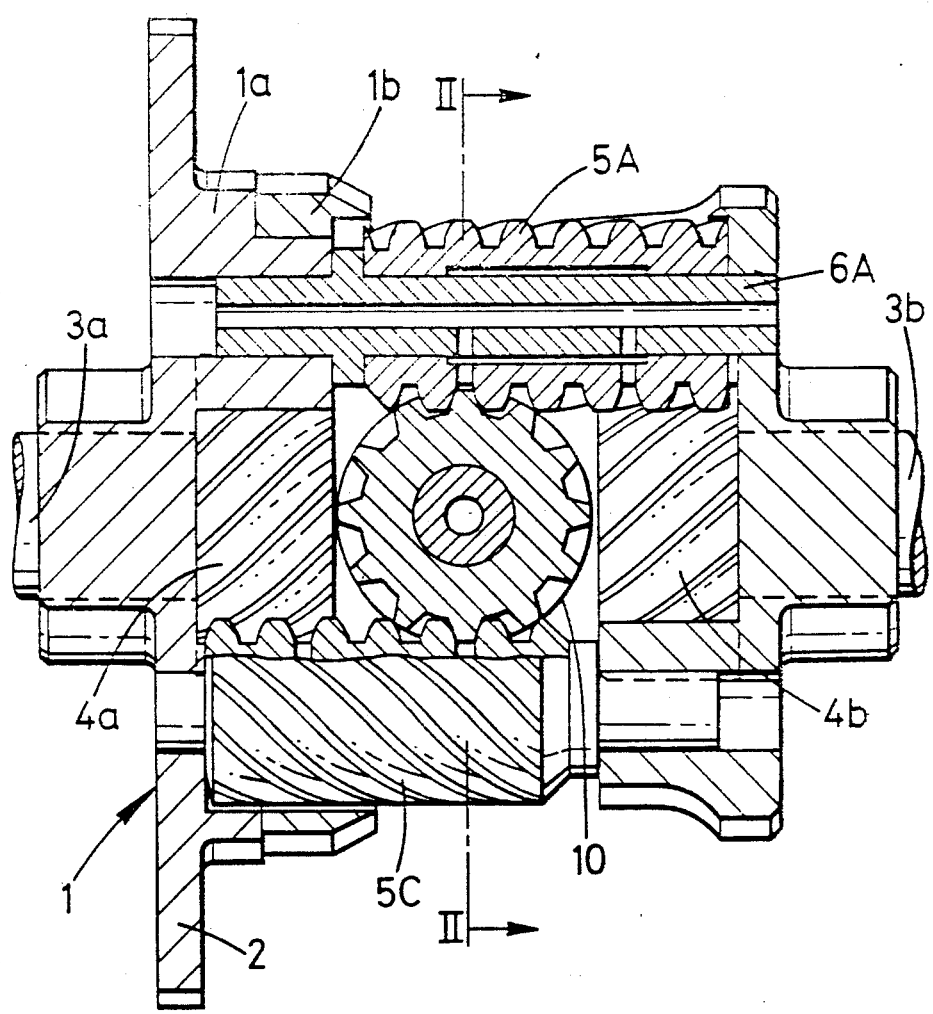
FIG. 1 is a longitudinal section on the line II of FIG. 2 of a differential gear mechanism for a vehicle.

The differential gear mechanism shown in the drawings, comprises a gear carrier 1 formed into two portions 1A, 1B secured together. The casing part 1A has a flange 2 which may form the output gear wheel of a transfer gearbox or have a bevel crown wheel bolted to it and forms the input member for the mechanism. Two co-axial output shafts 3A and 3B are rotatably supported in the gear carrier 1 and terminate at their inner ends in helically toothed output gears 4A and 4B each having fourteen teeth. Four identical seven-start worm members 5A, 5B, 5C and 5D are rotatably mounted on respective pins 6 in the carrier 1. The worm members 5A and 5B mesh with output gear 4B while the worm members 5C and 5D mesh with the output gear 4A. Each of the worm members and output gears have a helix angle of 46.9 degrees.

The helical portions of the worm members 5 are sufficiently long to enable them to mesh also with worm wheels 7A,C and 7B,D. As can be seen in FIG. 1, the worm members 5A and 5C mesh with the worm wheel 7A,C at diametrically opposite portions thereof while the worm members 5B and 5D mesh with worm wheel 7B,D also at diametrically opposite portions thereof.

The worm wheels 7 are both mounted on a common transverse pin 8 secured in a transverse bore in the gear carrier 1 by means of snap rings 9. The worm wheels 7 are positioned axially on the pin 8 at their outer lateral faces by bearing faces of the carrier part 1B and at their inner faces by bearing faces on a spacer block 10 which also presents two further bearing faces to the inner end faces of the output gears 4A and 4B (FIG. 1).

Figure 2:
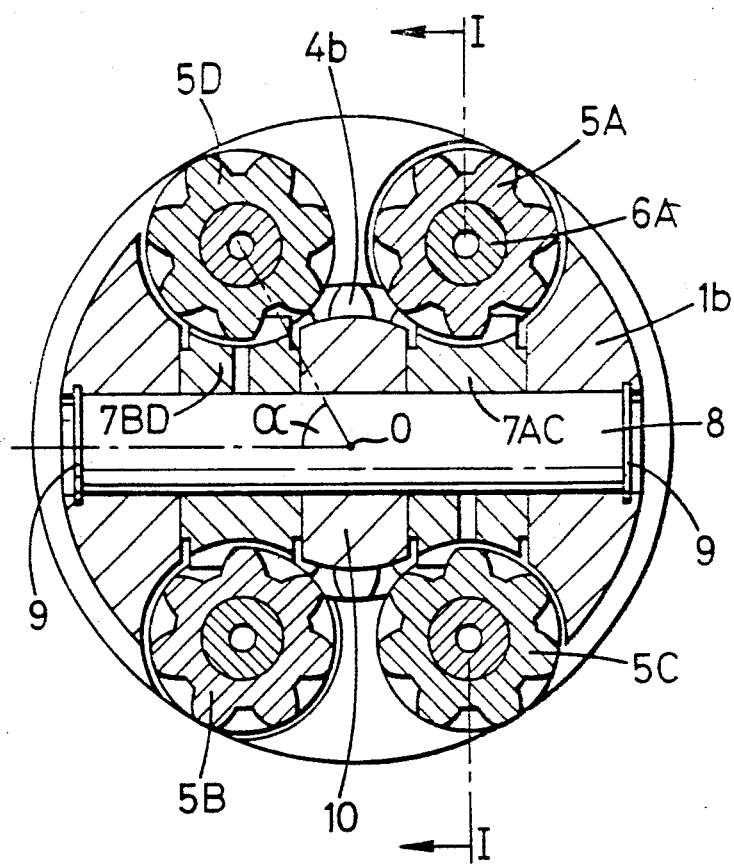
FIG. 2 is a cross section on the line II—II of FIG. 1.

In FIG. 2, the angle $\alpha$ used in equation 1 above can be seen as the angle between the axis of the pin 8 and the line from the axis 0 of the differential mechanism to the axis of the worm member 5D.

It will be appreciated that since the number of teeth on each of the toothed elements must be an integer, the application of the formulae given above cannot always be exact. Appropriate tolerances for the values of the constants have accordingly been given above.

I claim:

1. A differential gear mechanism comprising a gear carrier (1A, 1B) mounted for rotation about an output axis of the differential, a pair of spaced coaxial helical output gears (4A, 4B) mounted for rotation in the carrier about the axis thereof, and gear trains mounted in said gear carrier and interconnecting the two output gears, each gear train comprising two helically toothed members (5A-D) coupled by a worm wheel (7A, C; 7B, D), the teeth of said output gears being formed as a continuous helix and having a uniform involute profile in a radial direction, forming a helicoidal worm mesh with said worm wheel and a conventional helical pinion at an output gear mesh, the mechanism being characterized by the parameters in the following equations:

$$\frac{R_W + \cot \psi}{R_W + R_G} = \sin \alpha \quad (1)$$

$$\frac{b_{WH}}{b_{OG}} = \frac{k1 \tan \psi}{\cos \psi} \quad (2)$$

where
$R_W$ is the ratio of the number of teeth of each worm to the number of teeth of the worm wheel,
$R_G$ is the ratio of the number of teeth of each output gear to the number of teeth of the worm wheel,
$\psi$ is the helix angle of the worms and output gears,
$b_{WH}$ and $b_{OG}$ are respectively the lengths of the teeth of each worm wheel and each output gear measured axially of the worm wheel and output gear respectively,
K1 is the coefficient, selected from the range 0.5-0.8 for a differential mechanism having two gear trains and from the range 0.35-0.65 for a differential having three gear trains,
$\alpha$ is the angle formed by the axis of the worm wheels and a straight line going through the center of a worm and the center of symmetry of the mechanism (when viewed along the axis of the output gears), and selected for two gear trains (when K1 is 0.5-0.8) from a range of 56°-68°, and for three gear trains (when K1 is 0.35-0.65) from a range of 35°-41°.

2. A differential gear mechanism according to claim 1, further characterized in that $\alpha$ is in the range 58° to 66° and K1 is in the range 0.60 to 0.70 for two gear trains and in that $\alpha$ is in the range 36° to 40° and K1 is in the range 0.45 to 0.55 for three gear trains.

3. A differential gear mechanism according to claim 1 or claim 2, further characterised in that the aspect ratio (AR) of the gearing is given by:

$$AR = \frac{(R_G + 2R_W) \tan \psi}{1 + 1.2\, R_G \sin \psi} = 1.25 \pm 0.25$$

* * * * *

UNITED STATES PATENT AND TRADEMARK OFFICE
CERTIFICATE OF CORRECTION

PATENT NO. : 4,938,099

DATED : July 3, 1990

INVENTOR(S) : David J. Knight

It is certified that error appears in the above-identified patent and that said Letters Patent is hereby corrected as shown below:

Column 2, line 46, after "(FIG. 1)." insert the following: —The teeth of the output gears have a uniform involute profile in a radial direction, forming a helicoidal worm mesh with the worm wheel and a conventional helical pinion at an output gear mesh.--

Signed and Sealed this

Fourteenth Day of May, 1991

Attest:

HARRY F. MANBECK, JR.

*Attesting Officer*  *Commissioner of Patents and Trademarks*